April 4, 1961   B. H. KASS   2,978,213
VIBRATION ISOLATION ARRANGEMENTS
Filed Sept. 15, 1958   3 Sheets-Sheet 1
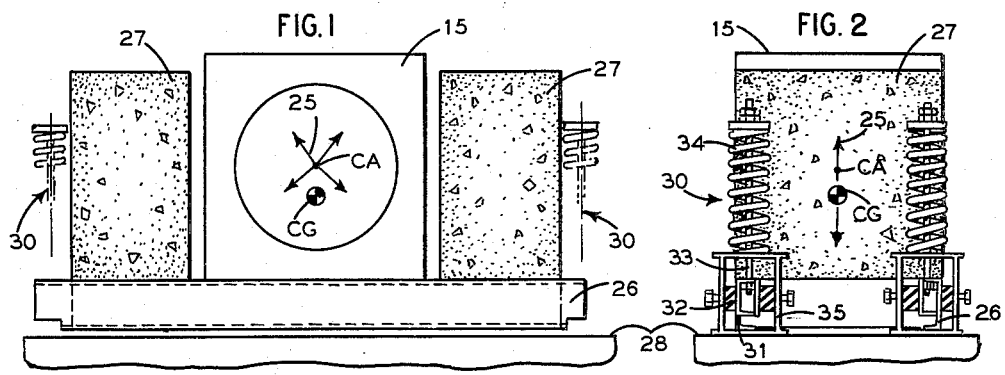
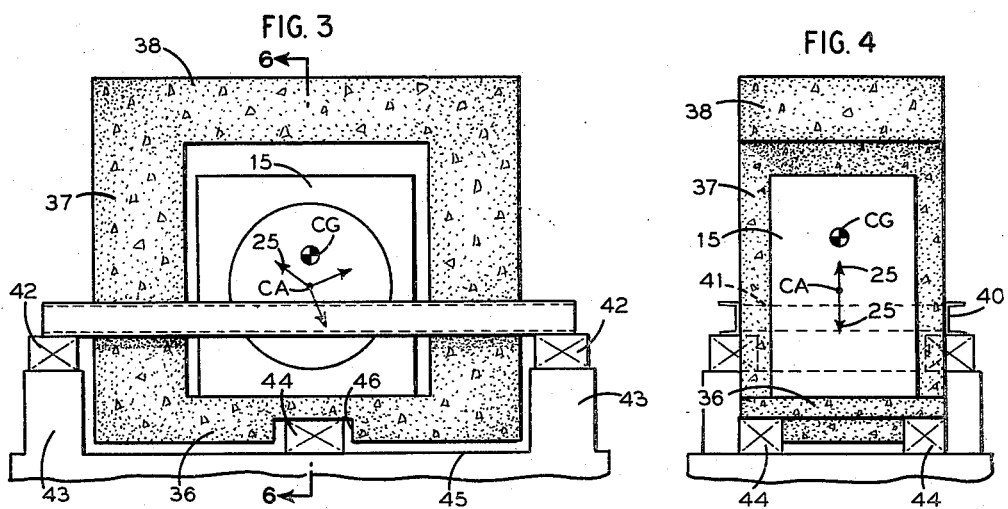
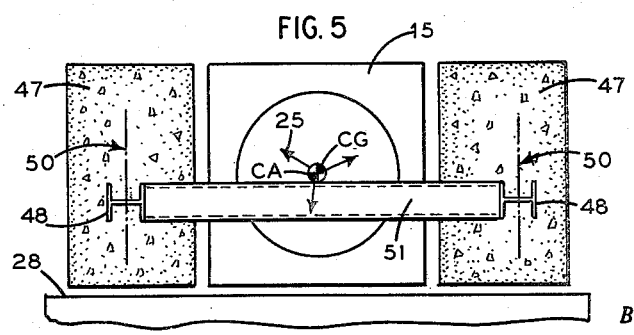
INVENTOR.
Bernard H. Kass
BY
Irving Seidman
ATTORNEY April 4, 1961  B. H. KASS  2,978,213
VIBRATION ISOLATION ARRANGEMENTS
Filed Sept. 15, 1958  3 Sheets-Sheet 2
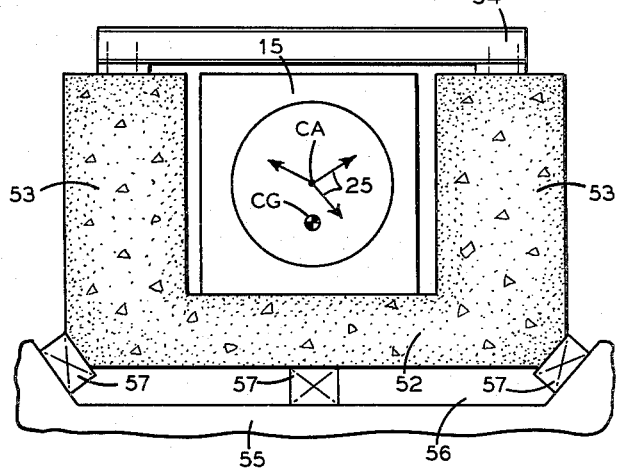
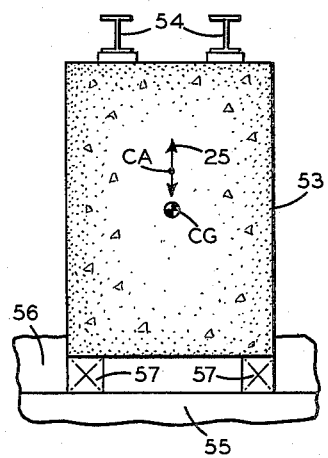
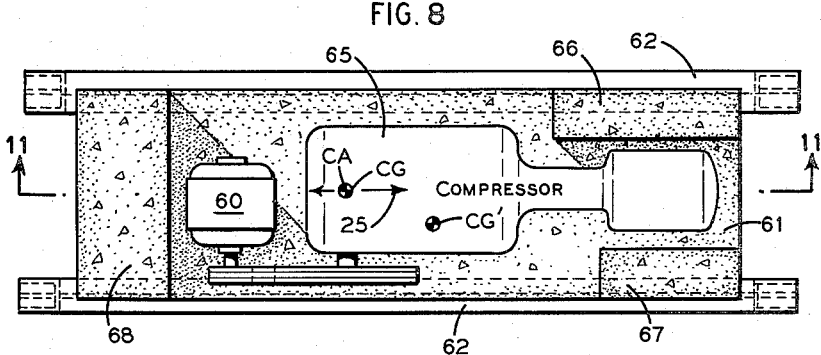
INVENTOR.
Bernard H. Kass
BY
Irving Seidman
ATTORNEY

United States Patent Office 2,978,213
Patented Apr. 4, 1961

2,978,213

VIBRATION ISOLATION ARRANGEMENTS

Bernard H. Kass, Hicksville, N.Y., assignor to Machinery Mountings, Inc., Hicksville, N.Y., a corporation Filed Sept. 15, 1958, Ser. No. 761,223

9 Claims. (Cl. 248—20)

This invention relates to vibration isolation arrangements and mountings and, more particularly, to novel arrangements or mounts of the vibration isolation type in which the inertial mass required to limit dynamic movements and forces to a permissibly smaller pre-set value, the cost of the installation, the space requirements are all substantially reduced as compared to known vibration isolation arrangements.

Vibration isolation mountings are used with various types of machinery and equipment in which it is desired either to prevent excessive dynamic forces and couples being transmitted to a supporting structure, such as a floor of a building, or to protect delicate instruments or equipment from vibrations present or induced in the supporting structure. The types of machinery and equipment with which vibration isolation arrangements are used are equipment and machines which, in normal operation, generate vibrations of such magnitude that the mass and/or moment of inertia of the equipment itself is insufficient to prevent vibrations of an unacceptable magnitude being transmitted to the supporting structure. The vibrations may consist of dynamic forces and dynamics couples which are either constant or variable in direction and/or magnitude and which may act either singly or in combination.

Apparatus or equipment of this type may include, for example, laundry extraction or extraction-drying machines, centrifuges, compressors, pumps, engines, vibrating screens, separators, and other similar equipment of different sizes, models, and design. To maintain the transmitted vibrations at or below an acceptable level, the apparatus or equipment has integrally associated therewith additional inertial mass, in the form of concrete, cast metal, sand bags, or other relatively heavy material, either singly or in combination. The equipment and its additional inertial mass are mounted on a base which is supported from the supporting structure through suitable shock and vibration absorbing means such as springs and/or other forms of vibration absorbing and damping means.

Hitherto, such additional inertial mass has generally been provided in the form of heavier supporting bases and heavier structural elements transmitting the forces to shock absorbing and damping means connected to the supporting structure. Thus, in addition to limited overhead clearances, limited allowable floor loadings, and poor soil bearing capacity, prior installations have been costly to install, economically impractical, and, in some cases, incapable of use in a particular case. For example, prior vibration isolating arrangements, particularly bulkier equipment generating severe vibrations, have required a floor or cellar pit, or an opening in a ceiling, to accommodate the installation including its added inertial mass.

Most importantly, however, the combined center of gravity of known inertial mass vibration isolation mountings has been so distant from the line of action of the unbalanced dynamic forces and/or couples that dynamic stability has been jeopardized and, in most cases, dynamic couples have even been introduced and amplified. By the term "line of action" as used herein is meant that line, spaced from the center of gyration or oscillation, along which, during operation of the equipment, the sum of the dynamic forces and couples acts in producing a torque or torques about the center of gyration or oscillation. For rotating equipments, the line of action is the perpendicular to the axis of rotation passing through the center of gravity of the unbalanced rotating mass. In translatory or relatively linear movement, the line of action is that line parallel to the direction of motion and passing through the center of gravity of the moving mass.

In accordance with the present invention, the foregoing disadvantages are obviated by so locating the inertial mass that a major portion or all thereof is at an elevation above the supporting base for the equipment, and so distributing the added inertial mass that the center of gravity of the combined equipment and additional inertial mass is at or substantially at the line of action of the unbalanced dynamic forces and/or dynamic couples generated by the equipment during normal operation. As compared to prior art systems, the added inertial mass extends upwardly from the supporting base, rather than downwardly as in known systems. Additionally, the height and lateral distribution of the added inertial mass are so selected that the "combined" center of gravity of the equipment and the additional inertial mass coincides as closely as practically possible with the line of action of the unbalanced dynamic forces and/or couples, rather than being substantially spaced from and beneath such line as in known systems.

By the invention arrangement, not only is the overall height of the installation, including its mounting platform, maintained within the normal overall height of the equipment alone and its mounting platform, but also the amount of added inertial mass is substantially reduced. The arrangement of the invention may be used with any type of vibration absorbing and damping connections between the supporting base and the supporting structure. Furthermore, these connections can be so located that their center or centers of gravity substantially coincide with the center of gravity of the equipment and its added mass and with the line of action of the unbalanced dynamic forces and/or couples.

For an understanding of the invention principles, reference is made to the following description of typical embodiments thereof as illustrated in the accompanying drawings. In the drawings:

Figs. 1 and 2 are side and end elevation views, respectively, of one form of a vibration isolating mounting according to the invention;

Fig. 3 is a side elevation view of a modification;

Fig. 4 is a sectional view on the line 4—4 of Fig. 3;

Fig. 5 is a side elevation view of a further modification;

Figs. 6 and 7 are side and end elevation views, respectively, of another modification;

Figs. 8 and 9 are plan and side elevation views, respectively, of still a further modification as applied to a compressor or vacuum pump.

Figure 9:
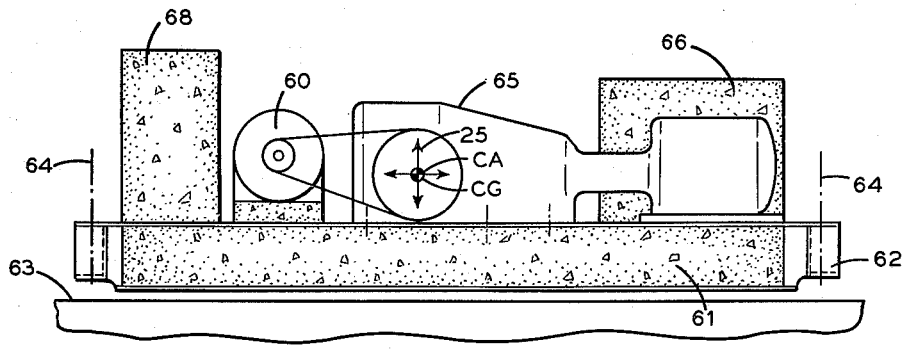

In the vibration isolation arrangement of the invention as shown in Figs. 1 and 2, the objectionable factors heretofore mentioned are avoided by adding the inertial mass above the support surface for machine 15. Referring to Figs. 1 and 2, machine 15 is seated on the upper surface of a support base comprising structural elements 26 extending laterally on each side of the machine. The added inertial mass comprises masses 27, of concrete or the like, on the upper surface of base elements 26 and of a height sufficient to raise the center of gravity C.G. of the combined installation to at or closely adjacent the line of action CA of the unbalanced dynamic forces and/or couples 25.

Elements 26 are supported from floor or supporting structure 28 through suspension type vibration absorbing and/or damping supports generally indicated at 30. The base elements 26 are secured to guide shoes 31 engaged with cushion damping elements 32 adjustable by means or horizontal bolts threaded into support pedestals 35 on support surface 28. Shoes 31 or elements 36 are secured on rods 33 extending upwardly through and supported on the upper ends of vibration absorbing coil springs 34 seated on pedestals 35. It will be noted that the support level of machine 15, springs 34, base 26, and masses 27 is adjacent the general level of points C.G. and CA.

By providing the added inertial mass above the support surface of machine 15, the mass and weight required are greatly reduced, the clearance required for installation is greatly reduced, and the moment between the center of gravity C.G. and the line of unbalanced dynamic action CA is reduced to a negligible value. Not only are the vibrations transmitted to structure 28 reduced to a nominal value, but also the oscillation during operation of machine 15 is reduced greatly in amplitude.

In the embodiment of Figs. 3 and 4, the added inertial mass includes a platform portion 36, to which the base of machine 15 is secured, masses 37, 37 extending upwardly from the base of machine 15 on each side of the machine, and a mass 38 extending between masses 37 and over the top of machine 15. It will be noted that the overall height of the inertial mass, above the base of machine 15, is only slightly in excess of that of the machine itself.

Structural elements 41 are embedded in masses 37 and are connected to main support structural members 40 extending across the front and back of machine 15 and laterally therebeyond. Members 40 are somewhat below the level of the line of action CA and their ends are supported on vibration absorbing and damping means 42 seated on pedestals 43, on supporting structure or floor 45, on each side of machine 15. Vibration absorbing and damping means 44 are set into recesses 46 in platform 36 at the front and rear edges of the latter, and are engaged with floor 45. It will be noted that, in this embodiment, the combined center of gravity C.G. is closely adjacent but slightly above the line of unbalanced dynamic forces and/or couples CA, and the center of gravity of the resilient supports is slightly below line CA.

In the arrangement of Fig. 5, added inertial masses 47, 47 are disposed on each side of machine 15 and have a height substantially equal to that of the machine. Thus, the combined center of gravity C.G. is coincident with the line of action CA. Structural elements 48 are embedded in masses 47 and extend therebeyond for support on mounting elements 50 which may be the same as the elements 30 of Figs. 1 and 2. Machine 15 is supported on transverse structural elements 51, extending across the front and back of the machine and connected to elements 48.

In the embodiment of Figs. 6 and 7, the added inertial mass includes a platform section 52, and masses 53 on each side of machine 15 connected by structural elements 54 extending over the machine. In this case, the equipment extends a short distance into a shallow recess 56 in floor or supporting structure 55, with platform section 52 being mounted on vibration absorbing and clamping means 57 engaged with the base and sloping side walls of recess 56. In this case, the combined center of gravity C.G. is closely adjacent but below the line of action CA. Instead of the floor being recessed, sloping isolators may extend above the floor level which latter would then be at the level of recess 56.

Figs. 8 and 9 illustrate the principles of the invention as applied to a motor 60 driving a compressor 65 having a normal combined equipment center of gravity C.G.' offset laterally of the longitudinal center line of compressor 65 and offset from the crank shaft axis. The motor and compressor are mounted on the upper surface of a relatively massive platform 61 having structural elements 62 along each side edge mounted on floor 63 through the medium of vibration absorbing elements 64 which may be identical with the elements 30 of Figs. 1 and 2.

In this case, by adding an inertial mass 66 at one side of compressor 65 and having a mass greater than a second inertial mass 67 added at the other side of the compressor, the center of gravity is moved laterally to the center line of compressor 65 and longitudinally toward the outer end of the compressor. Then, by adding an inertial mass 68 adjacent and beyond motor 60, the combined center of gravity C.G. is made longitudinally coincident with the line of action CA of the unbalanced dynamic forces and/or couples 25. Each of the added inertial masses 66, 67 and 68 extends upwardly from the upper surface of platform 61, thereby making line CA and center of gravity C.G. substantially coincident in side elevation.

Figure 10:
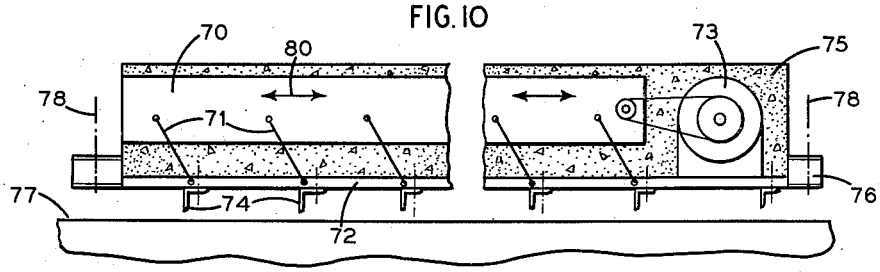
Figs. 10 and 11 are side and end elevation views, respectively, of the invention mounting as applied to a vibrating table, screen, or conveyor.
Figure 11:
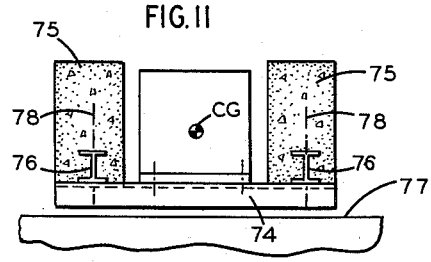

Figs. 10 and 11 illustrate the application of the invention to a reciprocating table 70 supported by hinged links 71, springs, or other means, from a base 72, and reciprocated, gyrated, or otherwise vibrated by a motor 73. Base 72 is supported on cross member 74. In this case, elongated inertial masses 75 are arranged along each side of the equipment and have longitudinal elements 76 embedded therein and extending therebeyond for support, from supporting surface or floor 77, by means of vibration absorbing and clamping elements 78. Masses 75, which extend upwardly from base 72, raise the combined center of gravity C.G. to the line of action of the unbalanced dynamic forces and/or couples indicated by arrows 80. For substantial equipment lengths, intermediate supports can be added beneath members 74.

With the described arrangement, the combined equipment and added inertial mass will experience dynamic movements substantially identical in direction to those of the generated unbalanced dynamic forces, so that no major secondary disturbances or movements are introduced. The added inertial mass is so located as to yield the largest increase in moment of inertial, of the combined system, per pound of added mass. Thus, the size of the added mass may be substantially reduced, reducing installation cost and weight.

While specific embodiments of the invention have been shown and described in detail to illustrate the application of the invention principles, it will be understood that the invention may be embodied otherwise without departing from such principles.

What is claimed is:

1. A vibration isolation mounting arrangement for a machine which, in normal operation, develops unbalanced dynamic forces, unbalanced dynamic couples, or both having a line of action producing a torque about a center of gyration, said mounting arrangement comprising, in combination, support platform means on which said machine is mounted; added inertial mass supported on said support platform means and extending upwardly from the base of said machine on at least one side of said machine, the height and lateral extent of said added inertial mass being such that the common center of gravity of said machine, said support platform, and said added inertial mass at least closely approaches coincidence with said line of action; and vibration absorbing and damping mounting means supporting said platform, machine, and added inertial mass on a support structure.

2. A vibration isolation mounting arrangement for a machine which, in normal operation, develops unbalanced dynamic forces, unbalanced dynamic couples, or both having a line of action producing a torque about a center of gyration, said mounting arrangement comprising, in combination, support platform means on which said machine is mounted; added inertial mass supported on said support platform means and extending upwardly from the base of said machine on both sides of said machine to a height of the order of that of said machine, the height and lateral extent of said added inertial mass being such that the common center of gravity of said machine, said support platform, and said added inertial mass at least closely approaches coincidence with said line of action; and vibration absorbing and damping mounting means supporting said platform, machine, and added inertial mass on a support structure.

3. A vibration isolation mounting arrangement for a machine which, in normal operation, develops unbalanced dynamic forces, unbalanced dynamic couples, or both having a line of action producing a torque about a center of gyration, said mounting arrangement comprising, in combination, support platform means on which said machine is mounted; added inertial mass supported on said support platform means and extending upwardly from the base of said machine on both sides of said machine and over the top of said machine, the height and lateral extent of said added inertial mass being such that the common center of gravity of said machine, said support platform, and said added inertial mass at least closely approaches coincidence with said line of action; and vibration absorbing and damping mounting means supporting said platform, machine, and added inertial mass on a support structure.

4. A vibration isolation mounting arrangement as claimed in claim 1 in which said support platform means includes structural elements extending laterally beyond said machine and said added inertial mass and supported by said mounting means.

5. A vibration isolation mounting arrangement as claimed in claim 4 in which said support platform means includes structural elements embedded in said added inertial mass.

6. A vibration isolation mounting arrangement as claimed in claim 4 in which the base of the machine is engaged with said structural elements.

7. A vibration isolation mounting arrangement as claimed in claim 4 in which said structural elements are at a level intermediate the height of the machine.

8. A vibration isolation mounting arrangement as claimed in claim 1 in which the center of gravity of said mounting means coincides substantially with such common center of gravity.

9. A vibration isolation mounting arrangement as claimed in claim 2 in which the height of the inertial masses is substantially equal to the height of the machine; and said support platform means includes first structural elements extending longitudinally of the masses and supported by said mounting means, and second structural elements extending between said first structural elements at each end of the machine and supporting the latter.

References Cited in the file of this patent
UNITED STATES PATENTS

| | | |
|---|---|---|
| 1,196,166 | Meyer et al. | Apr. 2, 1935 |
| 2,086,370 | Taub | July 6, 1937 |
| 2,468,043 | Crede et al. | Apr. 26, 1949 |